(12) United States Patent
Nguyenquang et al.

(10) Patent No.: US 12,330,882 B2
(45) Date of Patent: Jun. 17, 2025

(54) CONVEYANCE SYSTEM, CONVEYANCE METHOD, AND RECORDING MEDIUM RECORDING CONVEYANCE PROGRAM

(71) Applicant: SHARP KABUSHIKI KAISHA, Sakai (JP)

(72) Inventors: Thinh Nguyenquang, Sakai (JP); Takashi Iwamoto, Sakai (JP); Akihiro Yamakawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 727 days.

(21) Appl. No.: 17/716,821

(22) Filed: Apr. 8, 2022

(65) Prior Publication Data

US 2022/0324654 A1   Oct. 13, 2022

(30) Foreign Application Priority Data

Apr. 13, 2021   (JP) ................................. 2021-067738

(51) Int. Cl.
*B65G 43/00* (2006.01)
*G06Q 10/0875* (2023.01)

(52) U.S. Cl.
CPC ......... *B65G 43/00* (2013.01); *G06Q 10/0875* (2013.01)

(58) Field of Classification Search
CPC .............. G06Q 10/0875; B65G 1/1373; B65G 1/1375; B65G 1/1376
See application file for complete search history.

(56) References Cited

U.S. PATENT DOCUMENTS

| | | | |
|---|---|---|---|
| 10,783,462 B1 * | 9/2020 | Mo | G06Q 10/047 |
| 10,809,727 B1 * | 10/2020 | Eckman | G05D 1/0212 |
| 10,997,554 B1 * | 5/2021 | McMaster | G06Q 10/0875 |
| 11,449,825 B2 * | 9/2022 | Vijayan | G06Q 10/0837 |
| 11,465,848 B2 * | 10/2022 | Gong | G06Q 10/08 |
| 2018/0330316 A1 * | 11/2018 | Rajkhowa | G06Q 10/087 |
| 2023/0206174 A1 * | 6/2023 | Li | B65G 1/1378 |
| | | | 705/28 |

FOREIGN PATENT DOCUMENTS

| | | |
|---|---|---|
| JP | H10-120124 A | 5/1998 |
| JP | 2000-118640 A | 4/2000 |
| JP | 2020106914 A | 7/2020 |

* cited by examiner

*Primary Examiner* — Patrick H Mackey
(74) *Attorney, Agent, or Firm* — ScienBiziP, P.C.

(57) ABSTRACT

A conveyance system according to the present disclosure includes a conveyance request receiver that receives the conveyance requests of the conveyance targets, a starting area selector that selects a starting area from among the partial areas, a partial area traveling order setter that sets the starting area to one of the partial areas to be traveled first and sets partial area traveling order for traveling of an automatic conveyance apparatus, and a storage position traveling order setter that sets storage position traveling order of the automatic conveyance apparatus inside each of the partial areas. The automatic conveyance apparatus travels the partial areas in accordance with the partial area traveling order and travels the storage positions in accordance with the storage position traveling order inside each of the partial areas so as to convey the conveyance targets corresponding to the received conveyance requests inside the entire area.

11 Claims, 9 Drawing Sheets

FIG. 3

| ITEM ID | ITEM NAME | PARTIAL AREA ID | SHELF ID | PRIORITY ORDER WITHIN PARTIAL AREA | PICKING OPERATION TIME/EACH |
|---|---|---|---|---|---|
| G1 | BREAD | A1 | T11 | 1 | 10 |
| G2 | INSTANT NOODLE | A1 | T12 | 2 | 10 |
| G3 | WATER | A1 | T13 | 3 | 20 |
| G4 | BANANA | A2 | T21 | 1 | 15 |
| G5 | APPLE | A2 | T21 | 1 | 15 |
| G6 | CARROT | A2 | T22 | 2 | 15 |
| G7 | CUCUMBER | A2 | T22 | 2 | 15 |
| G8 | PORK | A2 | T23 | 3 | 15 |
| G9 | FISH | A2 | T23 | 3 | 15 |
| G10 | FROZEN VEGETABLES | A3 | T31 | 1 | 20 |
| G11 | ICE | A3 | T32 | 2 | 20 |
| G12 | ICECREAM | A3 | T33 | 3 | 20 |

| ORDER ID | CUSTOMER ID | ORDERED ITEM | AMOUNT | ORDER DATE AND TIME |
|---|---|---|---|---|
| 1 | CUSTOM1 | ICECREAM | 2 | T1 |
| 2 | CUSTOM1 | ICE | 3 | T1 |
| 3 | CUSTOM2 | BANANA | 5 | T2 |
| 4 | CUSTOM2 | APPLE | 5 | T2 |
| 5 | CUSTOM3 | ICECREAM | 1 | T3 |
| 6 | CUSTOM3 | INSTANT NOODLE | 25 | T3 |
| 7 | CUSTOM4 | PORK | 3 | T4 |
| 8 | CUSTOM4 | FISH | 3 | T4 |
| 9 | CUSTOM5 | WATER | 10 | T5 |
| 10 | CUSTOM5 | INSTANT NOODLE | 5 | T5 |
| 11 | CUSTOM6 | CARROT | 3 | T6 |
| 12 | CUSTOM6 | CUCUMBER | 2 | T6 |

| UNIT ORDER ID | PARTIAL AREA ID | SHELF ID | PRIORITY ORDER WITHIN PARTIAL AREA | PICKING OPERATION TIME |
|---|---|---|---|---|
| O1 | A3 | T33, T32 | 3, 2 | 40, 60 |
| O2 | A2 | T21 | 1 | 150 |
| O3 | A3, A1 | T33, T12 | 3, 2 | 20, 250 |
| O4 | A2 | T23 | 3 | 90 |
| O5 | A1, A1 | T13, T12 | 3, 2 | 200, 50 |
| O6 | A2 | T22 | 2 | 75 |

FIG. 6

| SET ORDER ID | UNIT ORDER ID | PARTIAL AREA ID | SHELF ID | PRIORITY ORDER WITHIN PARTIAL AREA | PICKING OPERATION TIME |
|---|---|---|---|---|---|
| SET1 | O1, O3 | A1, A3 | T12, T32, T33 | 2, 2, 3 | 250, 60, 60 |
| SET2 | O2, O4 | A2 | T21, T23 | 1, 3 | 150, 90 |
| SET3 | O5, O6 | A1, A2 | T12, T13, T22 | 2, 3, 2 | 50, 200, 75 |

| SET ORDER ID | UNIT ORDER ID | PARTIAL AREA ID | SHELF ID | PRIORITY ORDER WITHIN PARTIAL AREA | PICKING OPERATION TIME |
|---|---|---|---|---|---|
| SET1 | O1, O3 | A3, A1 | T32, T33, T12 | 2, 3, 2 | 60, 60, 250 |
| SET2 | O2, O4 | A2 | T21, T23 | 1, 3 | 150, 90 |
| SET3 | O5, O6 | A1, A2 | T12, T13, T22 | 2, 3, 2 | 50, 200, 75 |

D4

FIG. 9
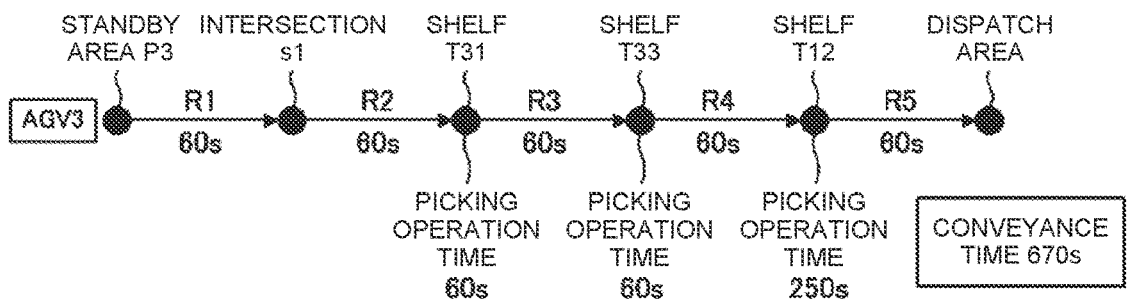
FIG. 10
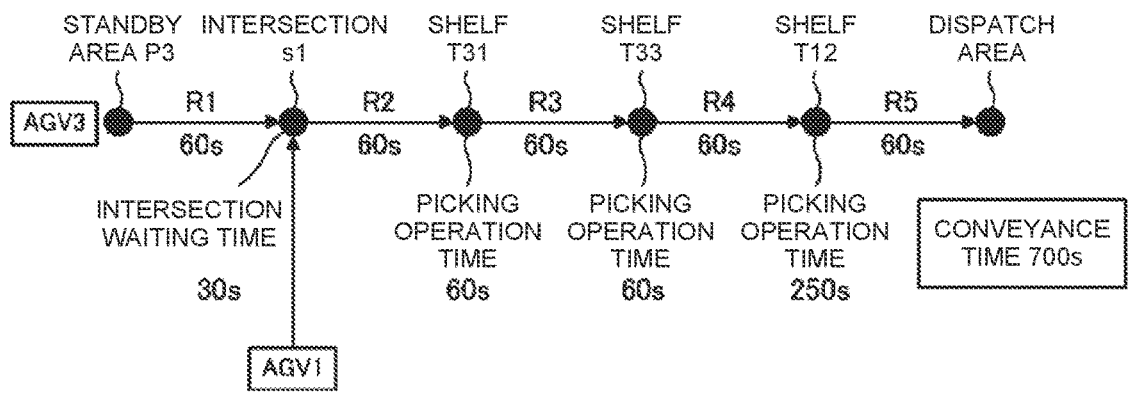
FIG. 11
D6a
| SET ORDER ID | UNIT ORDER ID | CONVEYANCE TIME |
|---|---|---|
| SET1 | O1, O3 | 700 |
| SET2 | O2, O4 | 500 |
| SET3 | O5, O6 | 600 |
| COMBINATION PATTERN A | [(O1, O3), (O2, O4), (O5, O6)] | 1800 |

| SET ORDER ID | UNIT ORDER ID | CONVEYANCE TIME |
|---|---|---|
| SET1 | O1, O3 | 700 |
| SET2 | O2, O5 | 660 |
| SET3 | O4, O6 | 640 |
| COMBINATION PATTERN B | [(O1, O3), (O2, O5), (O4, O6)] | 2000 |

| SET ORDER ID | UNIT ORDER ID | CONVEYANCE TIME |
|---|---|---|
| SET1 | O1, O3 | 700 |
| SET2 | O2, O6 | 700 |
| SET3 | O4, O5 | 800 |
| COMBINATION PATTERN C | [(O1, O3), (O2, O6), (O4, O5)] | 2200 |

CONVEYANCE SYSTEM, CONVEYANCE METHOD, AND RECORDING MEDIUM RECORDING CONVEYANCE PROGRAM

INCORPORATION BY REFERENCE

This application is based upon and claims the benefit of priority from the corresponding Japanese Patent Application No. 2021-067738 filed on Apr. 13, 2021, the entire contents of which are incorporated herein by reference.

BACKGROUND

The present disclosure relates to a conveyance system, a conveyance method, and a recording medium recording a conveyance program.

In general, a picking system has been proposed in which, upon receiving a picking order (conveyance request), the system travels storage positions of a plurality of items included in the picking order, picks the items in turn, and conveys the items to a dispatch area (shipment position).

A system that classifies, when specified items are to be picked up by traveling a plurality of storage shelves in order, data of the items to be picked up according to item storage zones, rearrange the data of the items for each storage zone, and output instructions for picking up the items according to the rearranged order has been used, for example. Furthermore, a system that determines a picking sequence that attains the least number of times traveling is performed and the least number of picking times has been used.

In the general picking systems, one of a plurality of items to be picked first in picking order when storage positions of the plurality of items in the picking order are traveled to pick the items in turn is not sufficiently taken into consideration. Therefore, a picking start position is concentrated at a certain position, and accordingly, loss of a conveyance time may occur due to traffic congestion.

Furthermore, when a picking start position is to be changed after the picking sequence is determined, the determination of the picking sequence is required to be performed again from the beginning, and therefore, the determination of a starting position of the picking may not be flexible.

SUMMARY

The present disclosure provides a conveyance system that realizes flexibility of a determination of a starting position of picking, a conveyance method, and a recording medium recording a conveyance program.

According to an aspect of the present disclosure, a conveyance system in which a plurality of partial areas are set inside an entire area in a warehouse, a plurality of storage positions storing conveyance targets are set inside each of the partial areas, and an automatic conveyance apparatus conveys the conveyance targets corresponding to received conveyance request inside the entire area, includes a conveyance request receiver that receives the conveyance requests, a starting area selector that selects a starting area that is one of the plurality of partial areas that is traveled first, a partial area traveling order setter that sets the starting area selected by the starting area selector to one of the partial area to be traveled first and sets partial area traveling order that is order of the plurality of partial areas traveled by the automatic conveyance apparatus, and a storage position traveling order setter that sets storage position traveling order that is order of storage positions traveled by the automatic conveyance apparatus inside each of the partial areas. The automatic conveyance apparatus travels the plurality of partial areas in accordance with the partial area traveling order and travels the plurality of storage positions in accordance with the storage position traveling order inside each of the plurality of partial areas so as to convey the conveyance targets corresponding to the received conveyance requests inside the entire area.

According to another aspect of the present disclosure, a conveyance method in which a plurality of partial areas are set inside an entire area in a warehouse, a plurality of storage positions storing conveyance targets are set inside each of the partial areas, and an automatic conveyance apparatus conveys the conveyance targets corresponding to received conveyance request inside the entire area, causes one or more processors to execute receiving the conveyance requests of the plurality of conveyance targets, selecting a starting area that is one of the plurality of partial areas that is traveled first, setting the starting area to one of the partial areas to be traveled first and setting partial area traveling order that is order of the plurality of partial areas traveled by the automatic conveyance apparatus, and setting storage position traveling order that is order of storage positions traveled by the automatic conveyance apparatus inside each of the partial areas. The automatic conveyance apparatus travels the plurality of partial areas in accordance with the partial area traveling order and travels the plurality of storage positions in accordance with the storage position traveling order inside each of the plurality of partial areas so as to convey the conveyance targets corresponding to the received conveyance requests inside the entire area.

According to a further aspect of the present disclosure, a non-transitory computer-readable recording medium records a conveyance program that sets a plurality of partial areas inside an entire area in a warehouse, that sets a plurality of storage positions storing conveyance targets inside each of the partial areas, and that causes an automatic conveyance apparatus to convey the conveyance targets corresponding to received conveyance request inside the entire area. The conveyance program causes one or more processors to execute receiving the conveyance requests of the plurality of conveyance targets, selecting a starting area that is one of the plurality of partial areas that is traveled first, setting the starting area to one of the partial areas to be traveled first and setting partial area traveling order that is order of the plurality of partial areas traveled by the automatic conveyance apparatus, and setting storage position traveling order that is order of storage positions traveled by the automatic conveyance apparatus inside each of the partial areas. The automatic conveyance apparatus travels the plurality of partial areas in accordance with the partial area traveling order and travels the plurality of storage positions in accordance with the storage position traveling order inside each of the plurality of partial areas so as to convey the conveyance targets corresponding to the received conveyance requests inside the entire area.

The present disclosure may provide a conveyance system that realizes flexibility of a determination of a starting position of picking, a conveyance method, and a recording medium recording a conveyance program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Further-

BRIEF DESCRIPTION OF THE DRAWINGS

FIG. 3 is a table showing an example of item information used in the conveyance system according to the embodiment of the present disclosure.

FIG. 4 is a table showing an example of order information used in the conveyance system according to the embodiment of the present disclosure.

FIG. 5 is a table showing an example of unit order information used in the conveyance system according to the embodiment of the present disclosure.

FIG. 6 is a table showing an example of set order information used in the conveyance system according to the embodiment of the present disclosure.

FIG. 7 is a table showing an example of set order information used in the conveyance system according to the embodiment of the present disclosure.

FIG. 9 is a diagram illustrating a calculation example of a conveyance time in the conveyance system according to the embodiment of the present disclosure.

FIG. 10 is a diagram illustrating a calculation example of a conveyance time in the conveyance system according to the embodiment of the present disclosure.

FIG. 11 is a table showing an example of conveyance time information calculated in the conveyance system according to the embodiment of the present disclosure.

FIG. 12 is a diagram illustrating an example of conveyance time information calculated in the conveyance system according to the embodiment of the present disclosure.

FIG. 13 is a diagram illustrating an example of conveyance time information calculated in the conveyance system according to the embodiment of the present disclosure.

DETAILED DESCRIPTION

An embodiment of the present disclosure will be described below with reference to the accompanying drawings to facilitate understanding of the present disclosure. It should be noted that the following embodiment is an example in which the present disclosure is embodied, and does not limit the technical scope of the present disclosure.

Conveyance System 10

Figure 1:
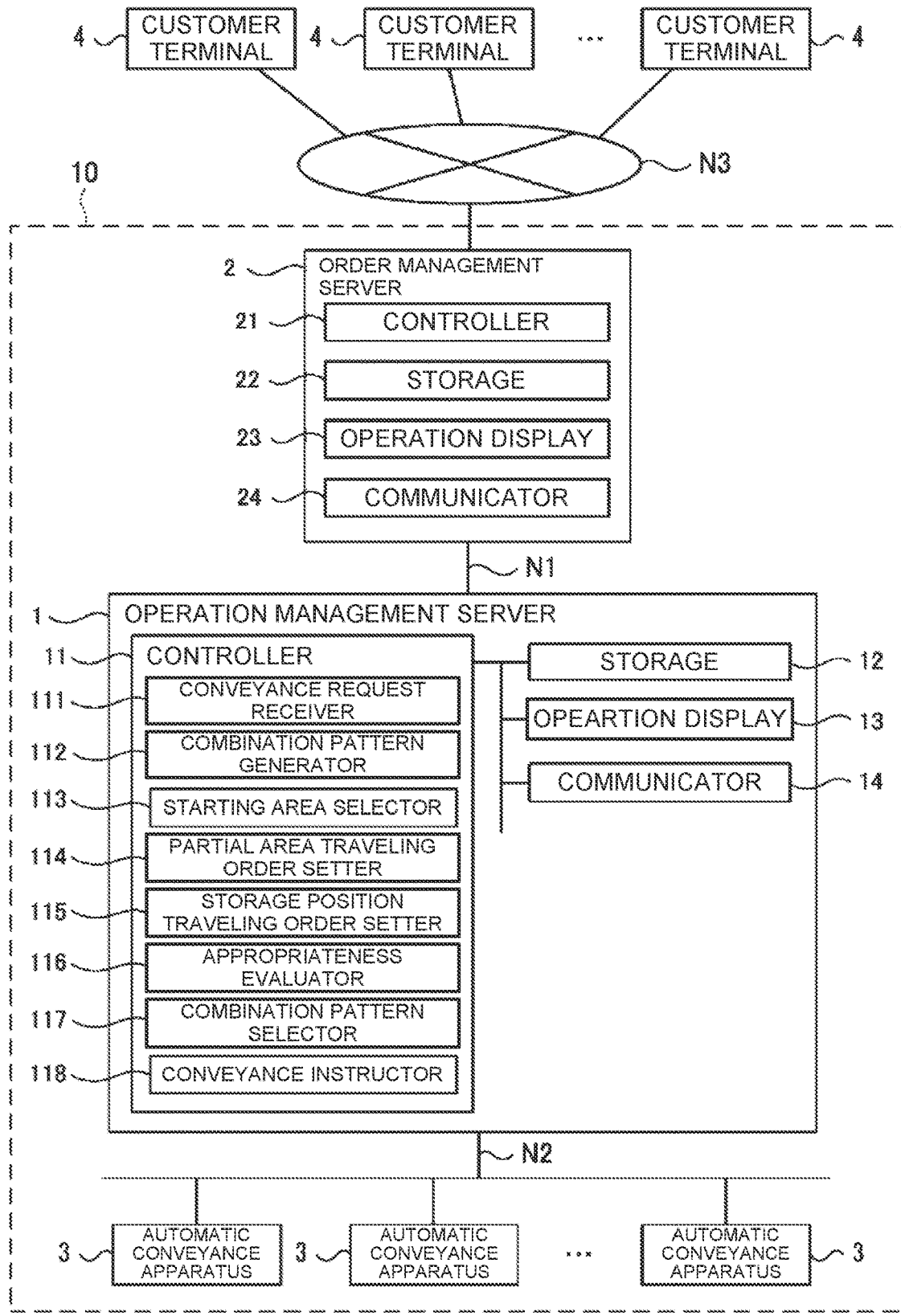
FIG. 1 is a block diagram illustrating a configuration of a conveyance system according to an embodiment of the present disclosure.

As shown in FIG. 1, the conveyance system 10 according to the embodiment of the present disclosure includes an operation management server 1, an order management server 2, and automatic conveyance apparatuses 3 (also referred to as AGVs or automatic guided vehicles). The operation management server 1 and the order management server 2 may communicate with each other through a communication network N1, such as a wired LAN or a wireless LAN. Furthermore, the operation management server 1 and the automatic conveyance apparatus 3 may communicate with each other through a communication network N2, such as a wireless LAN. The order management server 2 may also communicate with customer terminals 4 via a communication network N3, such as the Internet.

The conveyance system 10 is employed, for example, in a warehouse logistics warehouse) storing items (conveyance targets). When receiving an order for an item from a customer (customer terminal 4), the conveyance system 10 outputs a conveyance instruction to the automatic conveyance apparatus 3. When obtaining the conveyance instruction, the automatic conveyance apparatus 3 moves to a storage position (storage shelf) of the item, receives the item from a worker, and conveys the item to a dispatch area. The customer terminal 4 is an information processing apparatus, such as a personal computer or a smartphone, and a customer may access a website (order page) operated by the order management server 2 using the customer terminal 4 so as to order an item, for example.

The order management server 2 can receive orders for items from the individual customer terminals 4, and integrates individual received order information to be output to the operation management server 1. The operation management server 1 manages operations of the individual automatic conveyance apparatuses 3 and outputs conveyance instructions (traveling instructions) to the individual automatic conveyance apparatuses 3 based on the order information. Each of the automatic conveyance apparatuses 3 autonomously travels along a preset traveling route based on the conveyance instruction, picks an item included in the order information from a storage shelf, and conveys the item to the dispatch area. Note that the autonomous traveling method of the automatic conveyance apparatuses 3 is not particularly limited, and general methods, such as a method using a magnetic tape installed on a floor and a marker that prescribes a traveling operation (control information), may be employed.

Furthermore, each of the automatic conveyance apparatuses 3, for example, includes a plurality of containers (accommodation sections), each of which accommodates customer's ordered items, so that a plurality of items for customers are conveyed at once by single picking traveling (traveling from a standby area to the dispatch area through traveling on individual shelves). For example, when one of the automatic conveyance apparatuses 3 includes two containers, the automatic conveyance apparatus 3 may convey items ordered by two customers at once. The operation management server 1 outputs the conveyance instruction corresponding to the order information of one or more customers to the individual automatic conveyance apparatuses 3.

Figure 2:
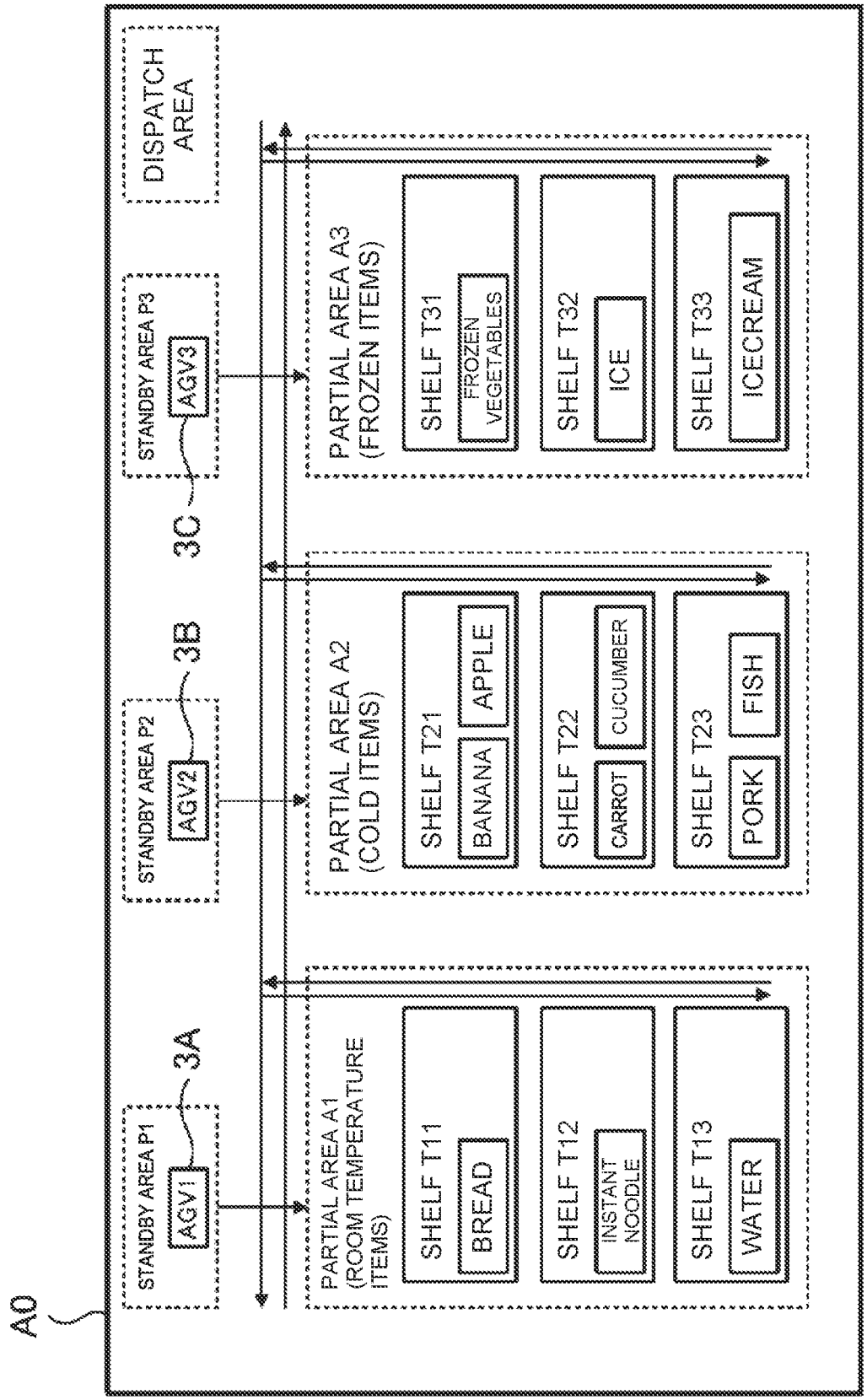
FIG. 2 is a diagram schematically illustrating a configuration of a warehouse to which the conveyance system according to the embodiment of the present disclosure is applied.

In this embodiment, a case where the conveyance system 10 is applied to the warehouse shown in FIG. 2 is illustrated as an example. The warehouse shown in FIG. 2 has a plurality of partial areas A1 to A3 (storage areas) inside an entire area A0, and, a plurality of storage shelves (storage positions) for storing items (conveyance targets) are arranged inside the partial areas A1 to A3. For example, shelves T11 to T13 are arranged inside the partial area A1, shelves T21 to T23 are arranged inside the partial area A2, and shelves T31 to T33 are arranged inside the partial area A3. The partial area A1 is a storage area for storing room temperature items, for example, the partial area A2 is a storage area for storing cold items, for example, and the partial area A3 is a storage area for storing frozen items, for example.

In the partial area A1, "bread" is stored on the shelf T11, "instant noodles" is stored on the shelf T12, and "water" is stored on the shelf T13. Furthermore, in the partial area A2, "banana" and "apple" are stored on the shelf T21, and "carrot" and "cucumber" are stored on the shelf T22, and "pork" and "fish" are stored on the shelf T23. In the partial area A3, "frozen vegetables" is stored on the shelf T31, "ice" is stored on the shelf T32, and "ice cream" is stored on the shelf T33.

Standby areas P for the automatic conveyance apparatuses 3 are also set inside the entire area A0. For example, in the entire area A0, a standby area P1 where an automatic conveyance apparatus 3A (AGV1) is waiting, a standby area P2 where an automatic conveyance apparatus 3B (AGV2) is waiting, and a standby area P3 where an automatic conveyance apparatus 3C (AGV3) is waiting are set. Each of the automatic conveyance apparatuses 3 waits at a corresponding one of the predetermined standby locations P before receiving a conveyance instruction from the operation management server 1.

Furthermore, in the warehouse, operation rules for the automatic conveyance apparatuses 3 are set in advance. For example, as order of movement among the partial areas, a rule of circulation in order of A1, A2, A3, A1, A2, and so on (partial area traveling order rule) is set. Also, within each of the partial areas, a rule for traveling in ascending order of numbers of the shelves (e.g., order of T11, T12, T13) (storage position traveling order rule) is set. In addition, traveling routes where the automatic conveyance apparatuses 3 travel are set in advance. Arrow marks shown in FIG. 2 indicate examples of the traveling routes.

For example, when receiving a conveyance instruction for order of items "instant noodles", "frozen vegetables", and "ice cream" from the operation management server 1, the automatic conveyance apparatus 3C (AGV3) picks, for a setting in which items of the partial area A3 are to be picked first, for example, "frozen vegetables" on the shelf T31 and then "ice cream" of the shelf T33, moves next to the partial area A1 to pick "instant noodles" on the shelf T12, and collectively conveys all the items to the dispatch area.

In this embodiment, the conveyance system 10 corresponds to a conveyance system according to the present disclosure, but the conveyance system according to the present disclosure may include only the operation management server 1 or may include at least one of the operation management server 1, the order management server 2, and the automatic conveyance apparatuses 3.

Order Management Server 2

As illustrated in FIG. 1, the order management server 2 includes a controller 21, a storage 22, an operation display 23, and a communicator 24. Note that the order management server 2 is not limited to a single computer, but may be a computer system including a plurality of computers operating cooperatively. In addition, various types of processing that are to be executed by the order management server 2 may be executed by one or more processors in a distributed manner.

The communicator 24 is a communication interface for connecting the order management server 2 to the communication network N1 in a wired or wireless manner to execute data communication in accordance with a predetermined communication protocol with the operation management server 1 through the communication network N1. Furthermore, the communicator 24 is a communication interface for connecting the order management server 2 to the communication network N3 in a wired or wireless manner to execute data communication in accordance with a predetermined communication protocol with at least one of the customer terminals 4 through the communication network N3.

The operation display 23 is a user interface including a display, such as a liquid-crystal display or an organic electroluminescence (EL) display, that displays various types of information, and an operation section, such as a mouse, a keyboard, or a touch panel that receives operations.

The storage 22 is a non-volatile storage, such as a hard disk drive (HDD) or a solid state drive (SSD), that stores various types of information. Specifically, the storage 22 stores data, such as item information D1 and order information D2. The item information D1 includes information about the items stored in the warehouse. The order information D2 includes information about a customer's order. FIG. 3 is a diagram illustrating an example of the item information D1, and FIG. 4 is a diagram illustrating an example of the order information D2.

As shown in FIG. 3, the item information D1 includes "item ID", "item name", "partial area ID", "shelf ID", "priority order within partial area", and "picking operation time" for each item. The item ID is identification information of an item, and the item name is a name of the item. The partial area ID is identification information of a partial area where a shelf storing the item is located. In this embodiment, as the partial area IDs, for example, "A1" indicating the partial area A1, "A2" indicating the partial area A2, "A3" indicating the partial area A3 are registered. The shelf ID is identification information of a shelf where the item is stored. In this embodiment, as the shelf IDs, for example, "T11" indicating the shelf T11, "T12" indicating the shelf T12, and "T13" indicating the shelf T13 are registered.

The priority order within partial area is information indicating the order for picking items in the partial area. The priority order within partial area corresponds to the order of movement of the automatic conveyance apparatus 3 within the partial area. For example, in the partial area A1, priority order is set to the shelf T11, the shelf T12, and the shelf T13 in this order. Furthermore, in the partial area A2, priority order is set to the shelf T21, the shelf T22, and the shelf T23 in this order. Furthermore, in the partial area A3, priority order is set to the shelf T31, the shelf T32, and the shelf T33 in this order. The priority order within partial area is set based on a storage position traveling order rule described below.

The picking operation time is information indicating a time required for a picking operation per the unit number of items. For example, a period of time from when one of the automatic conveyance apparatuses 3 arrives at the shelf T11 or the partial area A1 to when the automatic conveyance apparatus 3 accommodates "bread" that is an ordered item, that is, "10 seconds", is registered in association with "bread". The picking operation time is set in advance based on information of past work history. Note that the work of picking an ordered item from a shelf and storing the item in a container of the automatic conveyance apparatus 3 may be performed by a worker in charge of the partial area A1 or by a picking mechanism (not shown) of the automatic conveyance apparatus 3.

The item information D1 is stored in the storage section 22 in advance, for example, by the registration operation performed by a warehouse administrator. Furthermore, the administrator may update the item information D1 where appropriate. The item information D1 may also be registered in the operation management server 1.

As shown in FIG. 4, the order information D2 includes information on "order ID", "customer ID", "ordered item", "quantity", "order date and time". The order ID is identification information of an order, and the customer ID is identification information of a customer who ordered the item. The ordered item is a name of the item ordered by the customer, and the quantity is the number of ordered items. The order date and time is information on the date and time when the order is received from the customer. The order information D2 shown in FIG. 4 indicates following information, for example, a customer of "CUSTOM1" ordered "2 ice creams" and "3 pieces of ice" on a date and time "T1", and a customer "CUSTOM2" ordered "5 bananas" and "5 apples" in a date and time "T2".

The order information D2 is registered by the controller 21 every time the order management server 2 receives an order from one of the customer terminals 4.

Note that, as another embodiment, a portion or all of the item information D1 and the order information D2 may be stored in another server accessible from the order management server 2 through the communication network N3.

Furthermore, the storage 22 stores a control program, such as a conveyance program for causing the controller 21 to execute a conveyance process (refer to FIG. 14) described below. For example, the conveyance program non-temporarily recorded in a computer-readable recording medium, such as a CD or a DVD, is read by a reading apparatus (not illustrated), such as a CD drive or a DVD drive, included in the order management server 2, and is stored in the storage 22.

The controller 21 includes control devices, such as a CPU, a ROM, and a RAM. The CPU is a processor which executes various types of calculation processing. The ROM is a non-volatile storage storing in advance control programs, such as Basic Input/Output System (BIOS) and an operating system (OS), for causing the CPU to execute the various types of calculation processing. The RAM is a volatile or non-volatile storage storing various types of information, and is used as transitory storage memory (working area) for various processes that are executed by the CPU. The controller 21 controls the order management server 2 by causing the CPU to execute the various control programs stored in advance in the ROM or the storage 22.

Specifically, the controller 21 receives an order of an item from any one of the customer terminals 4. When receiving an order from one of the customer terminals 4, the controller 21 registers content of the order in the order information D2. Furthermore, the controller 21 outputs the order information D2 to the operation management server 1. For example, the controller 21 outputs, to the operation management server 1, the order information D2 (refer to FIG. 4) obtained by integrating a plurality of orders received in a predetermined period of time. In this way, the controller 21 also outputs the order information D2 to the operation management server 1 in a predetermined cycle.

As another embodiment, the controller 21 may output the order information D2 to the operation management server 1 when receiving a request for outputting the order information D2 from the operation management server 1. For example, the operation management server 1 may output a request for outputting the order information D2 to the order management server 2 based on an operation status of the automatic conveyance apparatus 3.

Furthermore, when outputting the order information D2 to the operation management server 1, the controller 21 may delete the order information D2 from the storage 22.

Operation Management Server 1

As illustrated in FIG. 1, the operation management server 1 includes a controller 11, a storage 12, an operation display 13, and a communicator 14. Note that the operation management server 1 is not limited to a single computer, but may be a computer system including a plurality of computers operating cooperatively. Furthermore, various types of processing that to be executed by the operation management server 1 may be executed by one or more processors in a distributed manner.

The communicator 14 is a communication interface for connecting the operation management server 1 to the communication network N1 in a wired or wireless manner to execute data communication in accordance with a predetermined communication protocol with the order management server 2 through the communication network N1. Furthermore, the communicator 14 is a communication interface for connecting the operation management server 1 to the communication network N2 in a wired or wireless manner to execute data communication in accordance with a predetermined communication protocol with at least one automatic conveyance apparatus 3 through the communication network N2.

The operation display 13 is a user interface including a display, such as a liquid-crystal display or an organic EL display, that displays various types of information, and an operation section, such as a mouse, a keyboard, or a touch panel that receives operations.

The storage 12 is a non-volatile storage, such as an HDD or an SSD, storing various information. Specifically, the storage 12 stores data, such as the unit order information D3 and the set order information D4. The unit order information D3 includes information about an order for each customer (unit order). The set order information D4 includes information about a set order obtained by combining unit orders. FIG. 5 is a diagram illustrating an example of the unit order information D3, and FIG. 6 is a diagram illustrating an example of the set order information D4.

As shown in FIG. 5, the unit order information D3 includes information on "unit order ID", "partial area ID", "shelf ID", "priority order within partial area", and "picking operation time" for each customer. The unit order ID is identification information of a unit order and identification information of a customer. For example, a unit order ID "O1" indicates a customer "CUSTOM1", a unit order ID "O2" indicates a customer "CUSTOM2", a unit order ID "O3" indicates a customer "CUSTOM3", a unit order ID "O4" indicates a customer "CUSTOM4", a unit order ID "O5" indicates a customer "CUSTOM5", and a unit order ID "O6" indicates a customer "CUSTOM6".

The partial area ID is identification information of a partial area where a shelf storing an item is located. For example, the customer "CUSTOM1" orders "ice cream" and "ice" (refer to FIG. 4), and "ice cream" is stored on the shelf T33 and "ice" is stored on the shelf T32 (refer to FIG. 3), and therefore, identification information indicating the partial area A3 where the shelves T33 and T32 are located is registered in the partial area ID corresponding to "O1". Furthermore, "T33" and "T32" are registered in the shelf ID corresponding to "O1". Moreover, a rank "3" for the shelf T33 and a rank "2" for the shelf T32 are registered in a column of the priority order within partial area corresponding to "O1". In addition, in a picking operation time corresponding to "O1", a picking operation time for the item "ice cream" on the shelf T33, that is, "40 seconds (20 seconds×2 pieces)" and a picking operation time for the item "ice" on the shelf T32, that is, "60 seconds (20 seconds×3 pieces)" are registered.

For example, the customer "CUSTOM3" orders "ice cream" and "instant noodles" (refer to FIG. 4), and "ice cream" is stored on the shelf T33 and "instant noodles" is stored on the shelf T12 (refer to FIG. 3), and therefore, identification information "A3" indicating the partial area A3 where the shelf T33 is located and identification information "A1" indicating the partial area A1 where the shelf T12 is located are registered in the partial area ID corresponding to "O3". Furthermore, "T33" and "T12" are registered in the shelf ID corresponding to "O3". Moreover, a rank "3" for the shelf T33 and a rank "2" for the shelf T12 are registered in a column of the priority order within partial area corresponding to "O3". In addition, in the picking operation time corresponding to "O3", a picking operation time for the item "ice cream" on the shelf T33, that is, "20 seconds (20 seconds×1 pieces)" and a picking operation time for the item "instant noodles" on the shelf T12, that is, "250 seconds (10 seconds×25 pieces)" are registered.

When obtaining the order information D2 from the order management server 2, the controller 11 generates the unit order information D3 with reference to the item information D1 (refer to FIG. 3).

As shown in FIG. 6, the set order information D4 includes information on "set order ID", "unit order ID", "partial area ID", "shelf ID", "priority order within partial area", and a "picking operation time" for each set order obtained by combining unit orders. The set order ID is identification information of a set order obtained by combining unit orders. The set order is obtained by combination performed by the controller 11 based on a predetermined condition (described below). For example, the set order ID "SET1" is identification information of a set order obtained by combining the unit order IDs "O1" and "O3", the set order ID "SET2" is identification information of a set order obtained by combining the unit order IDs "O2" and "O4", and the set order ID "SET3" is identification information of a set order obtained by combining the unit order IDs "O5" and "O6".

Identification information of unit orders included in a set order is registered as the unit order ID. For example, as the unit order IDs corresponding to "SET1", the unit order IDs "O1" and "O3" are registered.

The partial area ID is identification information of a partial area where shelves storing items corresponding to the unit orders included in the set order are located. For example, since the set order ID "SET1" includes the unit order IDs "O1" and "O3", "A1" indicating the partial area A1 corresponding to "O1" and "A3" indicating the partial area A3 corresponding to "O3" are registered.

In the shelf ID, for example, "T32" indicating the shelf T32 and "T33" indicating the shelf T33 of the items included in the unit order ID "O1" and "T12" indicating the shelf T12 and "T33" indicating the shelf T33 of the items included in the unit order ID "O3" that correspond to the set order ID "SET1" are registered.

For example, in the priority order within partial area, a priority rank "2" of the shelf T12 in the partial area A1 and priority ranks "2" and "3" of the shelves T32 and T33 in the partial area A3 that correspond to the set order ID "SET1" are registered.

In the picking operation time, a picking operation time "250 seconds" of the item "instant noodles" on the shelf T12 and a picking operation time "60 seconds" of the item "ice" on the shelf T32, and a picking operation time "60 seconds" of the item "ice cream" on the shelf T33 that correspond to the set order ID "SET1" are registered. Note that the picking operation time for the item "ice cream" on the shelf T33 is obtained by adding a picking operation time "40 seconds (20 seconds×2 pieces) for the item "ice cream" of the order (O1) of the customer "CUSTOM1" and a picking operation time "20 seconds (20 seconds×1 piece) for the item "ice cream" of the order (O3) of the customer "CUSTOM3" to each other.

When obtaining the order information D2 from the order management server 2, the controller 11 generates a combination pattern of the set orders based on a predetermined condition and generates the set order information D4. For example, the controller 11 generates a combination pattern A [(O1, O3), (O2, O4), (O5, O6)] by combining a set order [O1, O3], a set order [O2, O4], and a set order [O5, O6]. FIG. 6 shows an example of set order information D4 corresponding to the combination pattern A. As described in detail below, the controller 11 generates a plurality of combination patterns based on the predetermined condition and generates the set order information D4 corresponding to the individual combination patterns.

Note that, as another embodiment, a portion or all of the unit order information D3 and the set order information D4 may be stored in another server accessible from the operation management server 1 through the communication network N1. In this case, the controller 11 of the operation management server 1 may acquire the information from the other server and execute each process, such as a conveyance process described below (refer to FIG. 14).

Furthermore, the storage 12 stores a control program, such as a conveyance program for causing the controller 11 to execute a conveyance process (refer to FIG. 14) described below. For example, the conveyance program is non-temporarily recorded in a computer-readable recording medium, such as a CD or a DVD, is read by a reading apparatus (not illustrated), such as a CD drive or a DVD drive, included in the operation management server 1, and is stored in the storage 12.

The controller 11 includes control devices, such as a CPU, a ROM, and a RAM. The CPU is a processor which executes various types of calculation processing. The ROM is a non-volatile storage storing in advance control programs, such as BIOS and OS, for causing the CPU to execute the various types of calculation processing. The RAM is a volatile or non-volatile storage storing various types of information, and is used as transitory storage memory (working area) for various processes that are executed by the CPU. The controller 11 controls the operation management server 1 by causing the CPU to execute the various control programs stored in advance in the ROM or the storage 12.

Specifically, as shown in FIG. 1, the controller 11 includes various processors, such as a conveyance request receiver 111, a combination pattern generator 112, a starting area selector 113, a partial area traveling order setter 114, a storage position traveling order setter 115, an appropriateness evaluator 116, a combination pattern selector 117, and a conveyance instructor 118. Note that the controller 11 functions as the various processors when the CPU executes various processes in accordance with the conveyance program. Moreover, some or all of the processors may be configured by an electronic circuit. Note that the conveyance program may cause a plurality of processors to function as the processor described above.

The conveyance request receiver 111 accepts a conveyance request (picking order) for items (conveyance targets). Specifically, the conveyance request receiver 111 receives the order information D2 corresponding to a plurality of customer orders from the order management server 2. For example, the conveyance request receiver 111 receives the order information D2 (refer to FIG. 4) including orders of the customer CUSTOM1 to CUSTOM6.

The combination pattern generator 112 combines a plurality of conveyance requests received by the conveyance request receiver 111 to generate different combination patterns of different combinations (conveyance request combination patterns of the present disclosure).

Specifically, first, when the conveyance request receiver 111 receives the order information D2 (refer to FIG. 4) including six orders (unit order) of the customers CUSTOM1 to CUSTOM6, the combination pattern generator 112 generates the unit order information D3 (refer to FIG. 5) with reference to the item information D1 (refer to FIG. 3).

Next, the combination pattern generator 112 generates combination patterns of the six unit orders. Here, since the number of possible combinations of the six unit orders is large and a load of the calculation processing is large, in this embodiment, the combination pattern generator 112 generates a predetermined number of combination patterns based on a predetermined condition. Specifically, the predetermined condition includes the maximum number of combination patterns to be generated (upper limit). This prevents generation of a huge number of combination patterns. Furthermore, the combination pattern generator 112 generates combination patterns based on the predetermined condition and generates the set order information D4 (refer to FIG. 6) corresponding to the combination patterns.

For example, the combination pattern generator 112 sets a combination size of a set order (an example of the predetermined condition). Specifically, the predetermined condition includes the number or the maximum number of conveyance requests to be combined per combination pattern. The combination size corresponds to the number of containers for customers (conveyance requests) mounted on the automatic conveyance apparatus 3. For example, when two containers are mounted on the automatic conveyance apparatus 3, the combination pattern generator 112 sets a combination size of "2", and when three containers are mounted on the automatic conveyance apparatus 3, the combination pattern generator 112 sets a combination size of "3". When the combination size of "2" is set, the combination pattern generator 112 sets three groups (set orders) obtained by dividing the six unit orders (O1 to O6) into three groups each of which include two of the six unit orders.

Subsequently, the combination pattern generator 112 generates a combination pattern of the set orders based on a priority condition (an example of the predetermined condition). For example, when a priority condition "preferentially combine unit orders including a frozen item" is set, the combination pattern generator 112 preferentially combines the unit orders "O1" and "O3" including an order of a frozen item (refer to FIGS. 4 and 5). Accordingly, the picking operations on frozen items are preferentially integrated, and therefore, the number of times the automatic conveyance apparatus 3 passes through the partial area A3 where frozen items are stored may be reduced. Specifically, since items in a specific category are preferentially integrated, the picking operations can be more efficiently performed.

Thus, the predetermined condition includes priority information for specifying a conveyance request to be preferentially combined from among a plurality of conveyance requests. Furthermore, attribute information is set in advance to conveyance targets (items), and the priority information specifies a conveyance request to be preferentially combined from among a plurality of conveyance requests based on the attribute information set in the conveyance targets included in a plurality of combinations of the conveyance requests. Moreover, the priority information instructs that, among the plurality of conveyance requests, conveyance requests including the conveyance targets having the predetermined attribute information set thereto are preferentially combined with each other. For example, the priority information is the information (area information of the present disclosure) of the partial area ("partial area of frozen items" in the above example) to which the storage position (shelf) of the conveyance target belongs.

Subsequently, the combination pattern generator 112 generates combination patterns in a random manner (an example of the predetermined condition). Specifically, the combination pattern generator 112 randomly generates combination patterns each of which is a combination of two of the four unit orders "O2", "O4", "O5", and "O6" obtained by excepting the combination [O1, O3] that has been a determined combination from the unit orders "O1" to "O6". The maximum number of combination patterns generated by the four unit orders is "3", and therefore, three combination patterns are generated. Accordingly, the number of combination patterns of the six combination targets (unit orders) can be reduced to three. For example, the combination pattern generator 112 generates three combination patterns, that is, a combination of [(O1, O3), (O2, O4), (O5, O6)] (combination pattern A), a combination of [(O1, O3), (O2, O5), (O4, O6)] (combination pattern B), and a combination of [(O1, O3), (O2, O6), (O4, O5)] (combination pattern C). Note that these three combination patterns A, B, and C are selection candidates at this time point, and a most appropriate pattern is selected from among the three combination patterns A, B, and C in accordance with evaluation described below.

Thus, the combination pattern generator 112 randomly generates a combination pattern from among a plurality of candidate combination patterns when there are a plurality of candidate combination patterns that satisfy the predetermined condition.

Next, the combination pattern generator 112 generates the set order information D4 (refer to FIG. 6). Here, a method for generating the set order information D4 corresponding to the combination pattern A ([(O1, O3), (O2, O4), (O5, O6)]) will be described below. Specifically, the combination pattern generator 112 integrates individual unit orders of the unit order information D3 (refer to FIG. 5) to generate the set order information D4. For example, the combination pattern generator 112 integrates the partial area ID, the shelf ID, the priority order within partial area, and the picking operation time for the individual set orders ("SET1", "SET2", and "SET3"). Furthermore, the combination pattern generator 112 rearranges order of items into order from a smallest number of priority ranks in the partial area. In addition, the combination pattern generator 112 integrates the same partial area IDs or the same shelf IDs if any. For example, the shelf ID "T33" of the unit order "O1" and the shelf ID "T33" of the unit order "O3" are the same, and therefore, are integrated into one. Furthermore, the combination pattern generator 112 registers a total time in the picking operation time when the IDs are integrated. Note that the combination pattern generator 112 registers, in the picking operation time of "SET1", a total time "60 seconds" obtained by adding a picking operation time "40 seconds (20 seconds×2 pieces)" for the item "ice cream" of the order (O1) of the customer "CUSTOM1" and a picking operation time "20 seconds (20 seconds×1 piece) for the item "ice cream" of the order (O3) of the customer "CUSTOM3" to each other.

As described above, the combination pattern generator 112 generates a plurality of combination patterns of the set orders and generates the set order information D4 (refer to FIG. 6) corresponding to the combination patterns.

The following is a description of a conveyance procedure of one of the automatic conveyance apparatuses 3. First, the automatic conveyance apparatus 3 moves from a corresponding one of the standby areas P (refer to FIG. 2) to a partial area where items are to be first picked. The automatic conveyance apparatus 3 then picks the items in the arrived partial area while moving in order of a smaller shelf number (in order of priority) in accordance with the storage position traveling order rule. When the picking operation in the partial area is completed, the automatic conveyance apparatus 3 moves to another partial area if there are items to be picked in the other partial area. At that time, the automatic conveyance apparatus 3 moves to the other partial area and picks the items in accordance with the operation rule (the partial area traveling order rule). When the picking operation of all items is completed, the automatic conveyance apparatus 3 moves along the traveling route (refer to FIG. 2) to the dispatch area.

According to the conveyance procedure in accordance with the operation rule, a picking sequence within a partial area is fixed, but a picking sequence among partial areas is set in a predetermined circulation order, and therefore, the partial area where the picking is to be first performed may be freely selected, and the entire picking sequence is fixed once a partial area where the picking is to be first performed is selected. Accordingly, the partial area where the picking is to be first performed may be distributed among the plurality of automatic conveyance apparatuses.

Returning to FIG. 1, the starting area selector 113 selects a starting area which is a partial area to be first traveled from among the plurality of partial areas.

For example, in the set order information D4 shown in FIG. 6 generated by the combination pattern generator 112, since arrangement in order of priority in a partial area is employed, a partial area ID with the highest priority is designated as the starting area. In this case, concentration on a partial area with small partial area ID as a starting area may occur. For example, the partial area A1 has the highest priority in the set order "SET1", and the partial area A1 has the highest priority also in the set order "SET3", and therefore, when the picking operation starts, the automatic conveyance apparatus 3 in charge of the set order "SET1" and the automatic conveyance apparatus 3 in charge of the set order "SET3" are concentrated on the partial area A1.

Therefore, the starting area selector 113 changes the picking sequence so that the partial areas (starting areas) where the automatic conveyance apparatuses 3 first perform picking is distributed. Specifically, the starting area selector 113 designates starting areas for individual set orders.

In this example of the embodiment, the starting area selector 113 selects one of the partial areas A1 to A3 as the starting area. Any method of selecting the starting area may be used as long as the starting areas does not concentrate on a specific partial area. For example, the starting area selector 113 may randomly select the starting area such that frequencies of selections of the partial areas A1, A2, and A3 are even. The starting area selector 113 may also select the starting areas in accordance with an external request. For example, the starting area selector 113 may select partial areas designated by the operator as the starting areas.

Furthermore, the starting area selector 113 may measure congestion levels of the automatic conveyance apparatuses 3 in the current partial areas A1 to A3 so as to select one of the partial areas having the smallest congestion level as the starting area. By this, the starting areas are not concentrated on one portion but distributed.

It is assumed here that the partial area A3 is selected as the starting area for the set order "SET1", and the partial area A2 is selected as the starting area for the set order "SET2", and the partial area A1 is selected as the starting area for the set order "SET3". In this case, orders of the partial area IDs of "SET2" and "SET3" are the same as that of the set order information D4 (refer to FIG. 6) generated by the combination pattern generator 112, and therefore, the order is not required to be changed. On the other hand, in the set order "SET1", the starting area is changed from "A1" to "A3", and therefore, the starting area selector 113 is required to change the order of picking of the partial areas.

The starting area selector 113 changes the sequence of picking as follows. Specifically, when the order of movement among the partial areas is set in circulation order of A1, A2, A3, A1, A2, and so on in accordance with the traveling rule (partial area traveling order rule) and when the starting area selector 113 selects "A3" as the starting area, the partial area IDs are rearranged in order of A3, A1, and A2. In addition, the starting area selector 113 changes order of the shelf IDs, the priority order within partial area, and the picking operation times in accordance with the order of the partial area IDs. Note that the starting area selector 113 changes the order of the shelf IDs in accordance with a rule for moving in an ascending order of numbers of the shelves (for example, from T31 to T33) (storage position traveling order rule). Thus, the starting area selector 113 automatically selects the starting areas in accordance with the predetermined condition.

An example of the set order information D4 rearranged as described above is shown in FIG. 7. As shown in FIG. 7, the partial area IDs of the set order "SET1" are "A3" and "A1" arranged in this order. This means that the automatic conveyance apparatus 3 which is in charge of the set order "SET1" first picks items in the partial area A3, and thereafter, moves to the partial area A1 to picks items in the partial area A1.

The partial area traveling order setter 114 sets the starting areas selected by the starting area selector 113 as first partial areas to be traveled, and in addition, sets partial area traveling order that is order of traveling performed by the automatic conveyance apparatuses 3 on the plurality of partial areas. In this embodiment, the partial area traveling order rule is set to specify the order of traveling on the plurality of partial areas. The partial area traveling order setter 114 sets the starting areas selected by the starting area selector 113 as first partial areas to be traveled, and in addition, sets partial area traveling order of partial areas after the starting areas in accordance with the partial area traveling order rule. The partial area traveling order rule is set by the traveling order of the circulation of the partial areas. Here, as the partial area traveling order rule, a rule for a movement of the automatic conveyance apparatuses 3 circulating among the partial areas in order of A1, A2, A3, A1, A2, and so on is set. According to the partial area traveling order rule, the traveling order can be uniquely determined by setting a starting area.

The storage position traveling order setter 115 sets storage position traveling order which is order of storage positions (storage shelves) traveled by the automatic conveyance apparatuses 3 inside the individual partial areas. Specifically, the storage position traveling order rule that defines the order for traveling a plurality of shelves in a partial area is set, and the storage position traveling order setter 115 sets storage position traveling order based on the storage position traveling order rule. For example, the storage position traveling order rule is set by ranks of shelves in a partial area, and the storage position traveling order setter 115 sets the storage position traveling order based on the ranks set in the shelves in the partial area. For example, the storage position traveling order setter 115 sets the storage position traveling order for a plurality of shelves in a partial area in order of proximity to the standby location P.

Each of the automatic conveyance apparatuses 3 travels a plurality of partial areas in accordance with the partial area traveling order, and also travels a plurality of shelves in accordance with the storage position traveling order inside each of the plurality of partial areas, so that items requested to be conveyed (picking order) are conveyed inside the entire area A0.

The appropriateness evaluator 116 evaluates appropriateness of each of the plurality of combination patterns generated by the combination pattern generator 112. The appropriateness evaluator 116 evaluates the appropriateness of each of the plurality of combination patterns generated by the combination pattern generator 112 by performing an operation simulation of the automatic conveyance apparatuses 3. Specifically, the appropriateness evaluator 116 calculates total values of conveyance times of the plurality of combination patterns, respectively, by performing the operation simulation of the automatic conveyance apparatuses 3 for the plurality of combination patterns generated by the combination pattern generator 112, so that evaluation of the appropriateness is performed based on the total values of the conveyance times. Note that, as for the evaluation herein, a total time of conveyance times of all set orders included in a combination pattern is calculated as an evaluation value, as a concrete example. In this case, a combination pattern with a smallest evaluated value is the most appropriate.

An example of an evaluation method will be described in detail hereinafter. First, the appropriateness evaluator 116 obtains current operation statuses of the automatic conveyance apparatuses 3. Each of the automatic conveyance apparatuses 3 can communicate wirelessly with the operation management server 1, and a current position, a current speed, and the like are transmitted to the operation management server 1 at a frequency of approximately once every 10 seconds. Accordingly, the appropriateness evaluator 116 can recognize the operational statuses of the automatic conveyance apparatuses 3 in the warehouse in real time.

Next, the appropriateness evaluator 116 assigns the automatic conveyance apparatuses 3 to the set orders. Specifically, the appropriateness evaluator 116 recognizes the automatic conveyance apparatuses 3 that are currently in a standby state in the standby location P, and assigns the automatic conveyance apparatuses 3 to the set orders on a one-to-one basis. For example, the appropriateness evaluator 116 assigns the automatic conveyance apparatus 3C (AGV3) to the set order "SET1", the automatic conveyance apparatus 3B (AGV2) to the set order "SET2", and the automatic conveyance apparatus 3A (AGV1) to the set order "SET3".

Subsequently, the appropriateness evaluator 116 assigns traveling routes to the automatic conveyance apparatuses 3. Specifically, the appropriateness evaluator 116 assigns, to each of the automatic conveyance apparatuses 3, a traveling route that starts from the standby location P, that travels shelves in accordance with a picking sequence to pick up items, and that reaches a goal point that is the dispatch area. Note that the operation management server 1 stores traveling route information. This traveling route information includes a standard traveling time (a traveling time when there is no traffic congestion) and operation rules for each traveling route. The operation rules include, for example, a rule for a selection of one of the automatic conveyance apparatuses 3 that is preferentially allowed to enter an intersection and the other of the automatic conveyance apparatuses 3 that is not allowed to enter the intersection and brought into a standby state when the two automatic conveyance apparatuses 3 encounter each other at the intersection.

Thereafter, the appropriateness evaluator 116 executes an operation simulation. Specifically, the appropriateness evaluator 116 executes an operational simulation on the individual automatic conveyance apparatuses 3 so as to calculate conveyance times of the individual set orders. A conveyance time for a set order is obtained by adding picking operation times for individual items, a standard traveling time for the automatic conveyance apparatus 3 to move along the traveling route, and a congestion time to one another. Note that the picking operation times for the individual items and the standard traveling time are basically not variable values in the operation simulation, and therefore, the purpose of the operation simulation is to accurately calculate the congestion time. The appropriateness evaluator 116 estimates the congestion time of the automatic conveyance apparatus 3 by simulating the operation of the automatic conveyance apparatus 3, so that total values of the conveyance times are calculated for the individual combination patterns.

Figure 8:
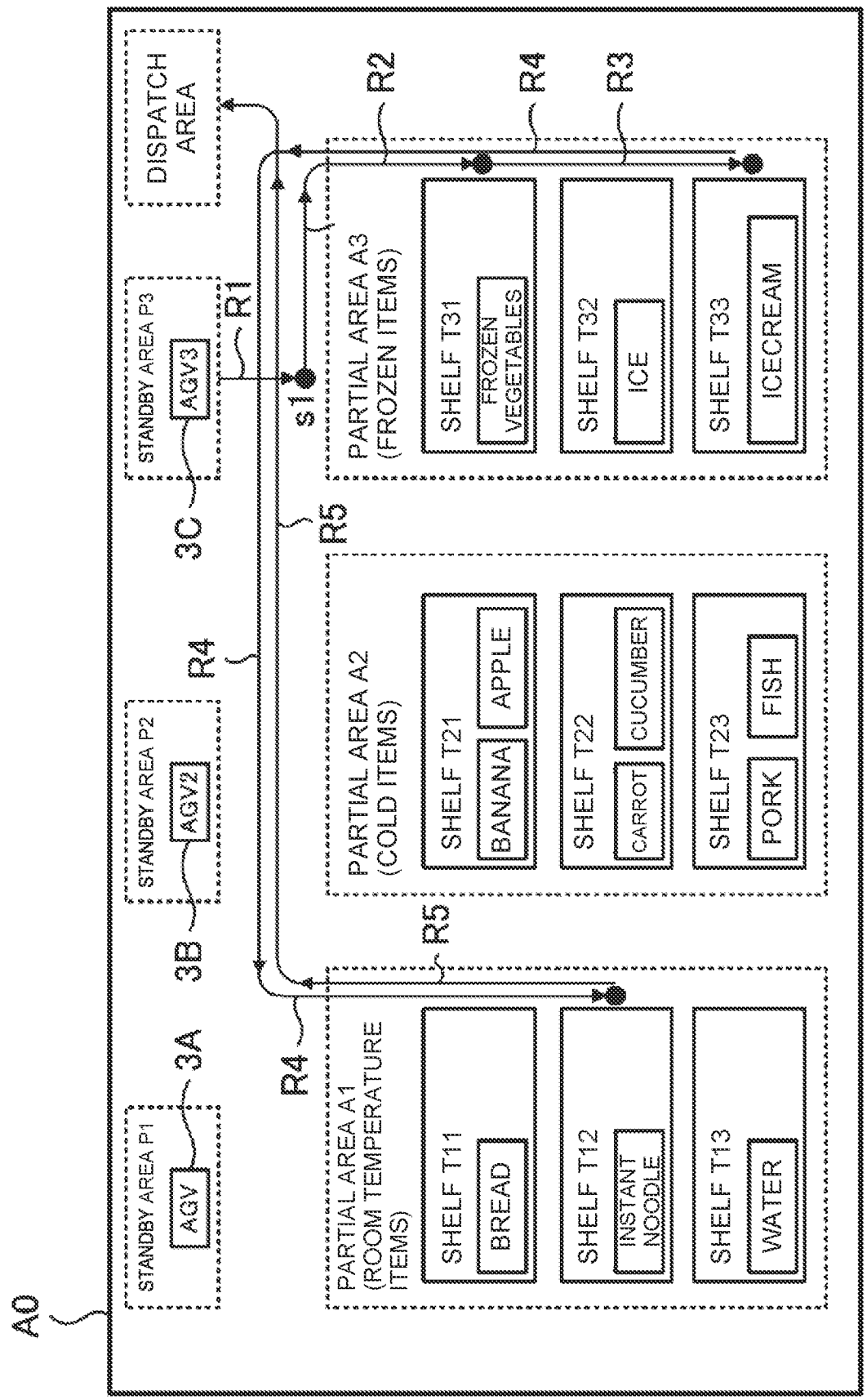
FIG. 8 is a diagram illustrating an example of a traveling route set in the conveyance system according to the embodiment of the present disclosure.

Here, as an example, a method for calculating conveyance times of the individual set orders by the operation simulation in the combination pattern A ([(O1, O3), (O2, O4), (O5, O6)] will be described. In a case, for example, where the automatic conveyance apparatus 3C (AGV3) being a standby state in the standby location P3 is assigned to the set order "SET1" and traveling routes R1 to R5 are assigned as illustrated in FIG. 8, when there is no traffic congestion on the traveling routes R1 to R5, the appropriateness evaluator 116, as shown in FIG. 9, obtains a conveyance time "670 seconds" by adding picking operation times and movement times to each other.

On the other hand, as a result of the operation simulation, occurrence of traffic congestion may be revealed on the traveling routes. For example, as shown in FIG. 10, in a case where the automatic conveyance apparatus 3C (AGV3) encounters the automatic conveyance apparatus 3A (AGV1) at an intersection s1 60 seconds after departing the standby location P3, when an operation rule at the intersection s1 is set such that the automatic conveyance apparatus 3A is preferentially allowed to enter the intersection s1 and the automatic conveyance apparatus 3C is to wait 30 seconds in front of the intersection s1, a waiting time of 30 seconds occurs at the intersection s1. In this case, the appropriateness evaluator 116 calculates a conveyance time "700 seconds" by adding the waiting time of 30 seconds at the intersection s1.

The appropriateness evaluator 116 similarly calculates conveyance times for the set orders "SET2" and "SET3". FIG. 11 shows conveyance times of the set orders in the combination pattern A ([(O1, O3), (O2, O4), (O5, O6)]) calculated by the appropriateness evaluator 116. Furthermore, the appropriateness evaluator 116 calculates a total conveyance time ("1800 seconds") which is a sum of the conveyance times of the individual set orders (refer to FIG. 11).

The appropriateness evaluator 116 similarly calculates conveyance times and total conveyance times of the individual set orders of the combination pattern B ([(O1, O3), (O2, O5), (O4, O6)]) and the combination pattern C ([(O1, O3), (O2, O6), (O4, O5)]) (refer to FIGS. 12 and 13). Conveyance time information D6a to D6c shown in FIGS. 11 to 13 are examples of the evaluation results.

The combination pattern selector 117 selects one of the plurality of combination patterns based on the evaluation results obtained by the appropriateness evaluator 116. Specifically, the combination pattern selector 117 selects one of the plurality of combination patterns corresponding to a shortest total conveyance time. For example, when the total conveyance times for the combination patterns A, B, and C are "1800 seconds", "2000 seconds", and "2200 seconds", respectively (refer to FIGS. 11 to 13), the combination pattern selector 117 selects the combination pattern A with the shortest total conveyance time.

The conveyance instructor 118 outputs a conveyance instruction to the automatic conveyance apparatus 3 based on the combination pattern selected by the combination pattern selector 117. Specifically, the conveyance instructor 118 transmits, to the automatic conveyance apparatuses 3 assigned to the set orders included in the selected combination pattern, conveyance instructions (a traveling route, a destination, and the like) corresponding to the set orders. For example, the conveyance instructor 118 transmits a conveyance instruction for SET1 to the automatic conveyance apparatus 3C (AGV3) assigned to the set order "SET1" included in the combination pattern A, transmits a conveyance instruction for SET2 to the automatic conveyance apparatus 3B (AGV2) assigned to the set order "SET2" included in the combination pattern A, and transmits a conveyance instruction for SET3 to the automatic conveyance apparatus 3A (AGV1) assigned to the set order "SET3" included in the combination pattern A.

Each of the automatic conveyance apparatuses 3 starts picking traveling when obtaining the conveyance instruction. Specifically, each of the automatic conveyance apparatuses 3 moves in front of a shelf where an ordered item is stored. A worker waiting in front of the shelf accommodates the ordered item in a container for a customer who ordered the item in the arrived automatic conveyance apparatus 3. When a picking operation for one item is completed, the automatic conveyance apparatus 3 moves in front of a shelf where a next ordered item is stored and performs a picking operation. The automatic conveyance apparatus 3 repeats the process until the picking operation is completed for all ordered items. The automatic conveyance apparatus 3 moves to the dispatch area after completing the picking operation on all the ordered items. When the automatic conveyance apparatus 3 arrives at the dispatch area, a worker waiting at the dispatch area attaches a shipping label to the container mounted on the automatic conveyance apparatus 3 and places the items on a shipping truck to ship the items to the customer.

As described above, when obtaining a plurality of conveyance requests from the order management server 2, the operation management server 1 selects an optimal combination pattern for the plurality of conveyance requests and outputs conveyance instructions to the automatic conveyance apparatuses 3.

Conveyance Process

Figure 14:
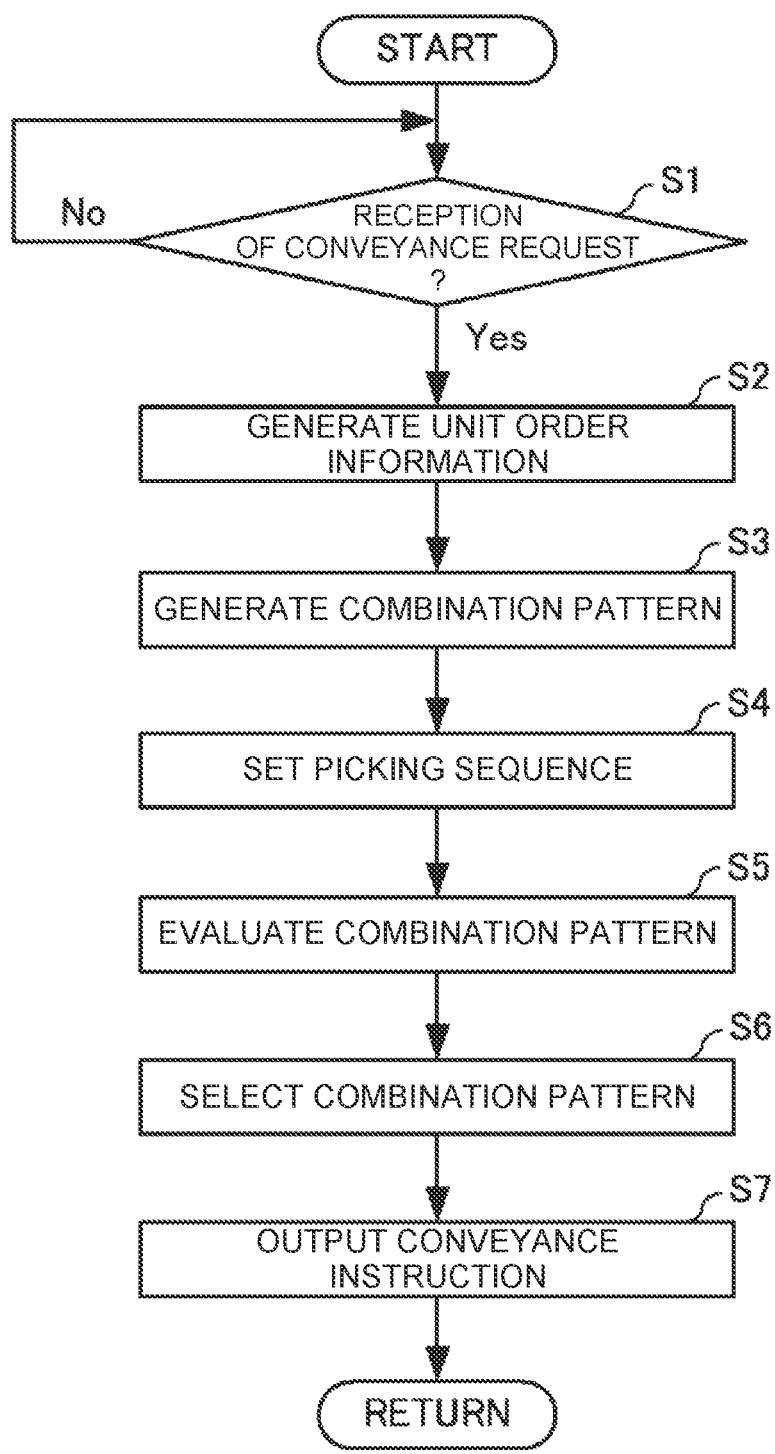
FIG. 14 is a flowchart illustrating an example of a procedure of a conveyance process executed in the conveyance system according to the embodiment of the present disclosure.

Hereinafter, a conveyance process executed by the conveyance system 10 will be described with reference to FIG. 14. Specifically, in this embodiment, the conveyance process is executed by the controller 11 of the operation management server 1. Furthermore, the controller 11 can execute a plurality of conveyance processes in parallel in response to a plurality of conveyance requests output from the order management server 2.

Note that the present disclosure can be regarded as a disclosure of a conveyance method for executing one or a plurality of steps included in the conveyance process. Furthermore, one or more steps included in the conveyance process described herein may be omitted where appropriate. In addition, the individual steps in the conveyance process may be executed in different order as long as similar operations and effects are obtained. Furthermore, although a case where the controller 11 executes steps in the conveyance process is described herein, a conveyance method in which one or more processors execute the steps of the conveyance process in a distributed manner is also regarded as another embodiment.

Here, as in the example above, the conveyance process will be described taking a case where the order information D2 (refer to FIG. 4) including the six orders (unit orders) of the customers CUSTOM1 to CUSTOM6 is received from the order management server 2 as an example.

First, in step S1, the controller 11 determines whether a conveyance request has been received from the order management server 2. Specifically, the controller 11 determines whether the order information D2 (refer to FIG. 4) has been received from the order management server 2. When the controller 11 has received the order information D2, the process proceeds to step S2.

In step S2, the controller 11 generates the unit order information D3 (refer to FIG. 5). Specifically, the controller 11 generates the unit order information D3 including six unit orders based on the order information D2 (refer to FIG. 4) and the item information D1 (refer to FIG. 3).

Next, in step S3, the controller 11 generates a combination pattern. Specifically, the controller 11 generates a predetermined number of combination patterns based on a predetermined condition. Furthermore, the controller 11 generates the set order information D4 (refer to FIG. 6) after generating combination patterns. For example, when a combination size of "2" of a set order is set, the controller 11 sets three groups (set orders) obtained by dividing the six unit orders (O1 to O6) into three groups each of which include two of the six unit orders. For example, the controller 11 combines the unit orders "O1" and "O3" including orders of frozen items based on a priority condition "preferentially combine unit orders including a frozen item" (refer to FIGS. 4 and 5). Furthermore, the controller 11 randomly combines twos of the four unit orders, that is, the unit orders "O2", "O4", "O5", and "O6".

In this way, the controller 11 generates three combination patterns, that is, a combination pattern A [(O1, O3), (O2, O4), (O5, O6)], a combination pattern B [(O1, O3), (O2, O5), (O4, O6)], and a combination pattern C [(O1, O3), (O2, O6), (O4, O5)].

Subsequently, in step S4, the controller 11 sets a picking sequence. Specifically, the controller 11 selects starting areas where the automatic conveyance apparatuses 3 first travel among a plurality of partial areas. For example, the controller 11 selects starting areas for the individual set orders by a selection operation performed by an operator, in a random manner, or based on congestion levels of the automatic conveyance apparatuses 3. Here, for example, the controller 11 selects the partial area A3 as a starting area for the set order "SET1", the partial area A2 as a starting area for the set order "SET2", and the partial area A1 as a starting area for the set order "SET3".

After setting the picking sequence, the controller 11 rearranges partial area IDs, order of shelf IDs, priority order within partial area, and picking operation times of the set order information D4 (refer to FIG. 7).

Then the controller 11 sets one of the partial areas that is first to be traveled as a starting area, and in addition, sets partial area traveling order that is order of traveling performed by the automatic conveyance apparatuses 3 on a plurality of partial areas (for example, traveling order of A1, A2, A3, A1, A2, and so on). The controller 11 sets storage position traveling order which is order of shelves traveled by the automatic conveyance apparatuses 3 inside the individual partial areas.

Next, in step S5, the controller 11 evaluates appropriateness for the individual combination patterns. Specifically, the controller 11 first observes in real time operation statuses (current position and traveling status) of all the automatic conveyance apparatuses 3 in the warehouse, and then assigns a conveyance instruction corresponding to the combination pattern to the automatic conveyance apparatus 3 that is currently in a standby state. Subsequently, the controller 11 performs an operation simulation for all the automatic conveyance apparatuses 3 including the automatic conveyance apparatus 3 corresponding to the assignment to estimate future events, such as traffic congestion, and calculates a conveyance time for the automatic conveyance apparatus 3 corresponding to the assignment. The controller 11 calculates conveyance times for the set orders "SET1", "SET2", and "SET3". Furthermore, the controller 11 also calculates conveyance times for the individual set orders and total conveyance times of the combination patterns A, B, and C.

FIG. 11 shows individual conveyance times and a total conveyance time of the set orders corresponding to the combination pattern A ([(O1, O3), (O2, O4), (O5, O6)]), FIG. 12 shows conveyance times and a total conveyance time of the set orders corresponding to the combination pattern B ([(O1, O3), (O2, O5), (O4, O6)]), and FIG. 13 shows conveyance times and a total conveyance time of the set orders corresponding to the combination pattern C ([(O1, O3), (O2, O6), (O4, O5)]).

In step S6, the controller 11 selects one of the plurality of combination patterns based on an evaluation result. Specifically, the controller 11 selects the combination pattern A corresponding to a shortest total conveyance time from among the combination patterns A, B, and C.

In step S7, the controller 11 outputs conveyance instructions to the automatic conveyance apparatuses 3 based on the selected combination pattern. Specifically, the controller 11 transmits conveyance instructions (a traveling route, a destination, and the like) for the set orders to the automatic conveyance apparatuses 3 assigned to the set orders included in the selected combination pattern. For example, the controller 11 transmits a conveyance instruction for SET1 to the automatic conveyance apparatus 3C (AGV3) assigned to the set order "SET1" included in the combination pattern A, transmits a conveyance instruction for SET2 to the automatic conveyance apparatus 3B (AGV2) assigned to the set order "SET2" included in the combination pattern A, and transmits a conveyance instruction for SET3 to the automatic conveyance apparatus 3A (AGV1) assigned to the set order "SET3" included in the combination pattern A.

By this, each of the automatic conveyance apparatuses 3 starts the picking operations in parallel when obtaining the conveyance instruction. The controller 11 repeats the above process every time the controller 11 obtains the conveyance request from the order management server 2. In this way, the controller 11 determines an optimal combination pattern of a plurality of conveyance requests by performing an operation simulation corresponding to the plurality of conveyance requests under the current operating conditions of the automatic conveyance apparatuses 3.

As described above, in the conveyance system 10 according to this embodiment, the automatic conveyance apparatuses 3 travel storage positions (shelves) of a plurality of conveyance targets (items) to convey the conveyance targets. The conveyance system 10 receives conveyance requests for the conveyance targets and combines the received plurality of conveyance requests to generate different combination patterns of different combinations. Furthermore, the conveyance system 10 evaluates the appropriateness of the generated combination patterns, selects one of the plurality of combination patterns based on results of the evaluation, and outputs conveyance instructions to the automatic conveyance apparatuses 3 based on the selected combination pattern.

In this way, the conveyance system 10 generates a plurality of combination patterns, evaluates appropriateness of the individual combination patterns, and employs one of the plurality of combination patterns based on results of the evaluation. In other words, the appropriateness of the individual combination patterns is evaluated (evaluation values are calculated), and the combination pattern with the highest evaluation value is employed.

Here, the general technique instructs the conveyance apparatuses to combine item request information that maximizes the number of types of the same item in the plurality of item request information, but does not evaluate whether a combination pattern of conveyance requests is actually appropriate. That is, it is unclear whether the general technique actually reduces loss of a conveyance time for picking traveling. On the other hand, according to this embodiment, a plurality of combination patterns of conveyance requests are generated, appropriateness of the combination patterns are actually evaluated, and comparison evaluations is performed on the plurality of combination patterns so that one of the combination patterns is selected. Accordingly, the loss of a conveyance time for picking traveling may be reduced when compared with the general techniques. Thus, the combinations of conveyance requests may be optimized. Furthermore, since the number of generated combination patterns is limited, a calculation load can be reduced.

In addition, in the conveyance system 10, a plurality of partial areas are set inside the entire area A0 of the warehouse, a plurality of storage positions (shelves) storing conveyance targets (items) are further set inside the individual partial areas, and the automatic conveyance apparatuses 3 convey conveyance targets corresponding to received conveyance requests inside the entire area A0. The conveyance system 10 receives conveyance requests of a plurality of conveyance targets, selects a starting area that is one of the partial areas that is first traveled, and sets the selected starting area as a partial area to be traveled first, and in addition, sets partial area traveling order that is order of the plurality of partial areas traveled by the automatic conveyance apparatuses 3. Furthermore, the conveyance system 10 sets storage position traveling order which is order of storage positions traveled by the automatic conveyance apparatuses 3 inside the individual partial areas. Accordingly, each of the automatic conveyance apparatuses 3 travels a plurality of partial areas in accordance with the partial area traveling order described above, and also travels a plurality of storage positions in accordance with the storage position traveling order inside the individual partial areas, so that the conveyance targets requested to be conveyed are conveyed in the entire area A0.

As described above, the conveyance system 10 has a hierarchical structure configured, as its first feature, such that a plurality of partial areas are set inside the warehouse (upper hierarchy) and a plurality of storage positions (shelves) are set inside the partial areas (lower hierarchy). Furthermore, the conveyance system 10 is configured, as its second feature, such that order of traveling on a plurality of partial areas inside the warehouse (upper hierarchy traveling order) and order of traveling on the storage positions in the partial areas (lower hierarchy traveling order) are set. Moreover, the conveyance system 10 is configured, as its third feature, such that a starting area to be traveled first is selectable from among the plurality of partial areas inside the warehouse.

According to these features, since the starting area to be traveled first is selectable from among the plurality of partial areas, order of traveling on the storage positions in the entire warehouse may be determined in accordance with the order of traveling on the plurality of partial areas inside the warehouse (the upper hierarchy traveling order) and the order of traveling on the storage positions (shelves) in the plurality of partial areas while the starting area is flexibly determined.

In other words, even when the starting area is changed, resetting of the order of traveling on storage positions to be performed at the beginning is not required, storage positions in the entire warehouse are uniquely determined when traveling is performed in accordance with determined rules (the order of traveling on the partial areas and the order of traveling on the storage positions in the partial area), and accordingly, an effect that the starting area can be easily changed may be attained.

The conveyance system according to the present disclosure is not limited to the above embodiment. As another embodiment of the present disclosure, the controller 11, for example, may calculate a total value of amounts of power consumption of the automatic conveyance apparatuses 3 corresponding to the plurality of combination patterns as an evaluation value and select a combination pattern with a lowest power consumption amount. Furthermore, the controller 11, for example, may calculate a total value of congestion times of the automatic conveyance apparatuses 3 corresponding to the plurality of combination patterns as an evaluation value so as to select a combination pattern with a shortest congestion time.

Furthermore, as another embodiment of the present disclosure, the controller 11 may utilize a quantum computer to perform the operation simulation. By this, even when a combination size of the set orders is large (when the number of containers mounted on the automatic conveyance apparatus 3 is large), the operation simulation may be executed in a short period of time.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A conveyance system in which a plurality of partial areas is set inside an entire area in a warehouse, a plurality of storage positions storing conveyance targets is set inside each of the plurality of partial areas, and an automatic conveyance apparatus conveys the conveyance targets corresponding to received conveyance requests inside the entire area, the conveyance system comprising:
    a conveyance request receiver that receives the conveyance requests of the conveyance targets;
    a starting area selector that selects a starting area that is one of the plurality of partial areas that is traveled first;
    a partial area traveling order setter that sets the starting area selected by the starting area selector to one of the plurality of partial areas to be traveled first and sets a partial area traveling order that is an order of the plurality of partial areas traveled by the automatic conveyance apparatus; and
    a storage position traveling order setter that sets a storage position traveling order that is an order of the plurality of storage positions traveled by the automatic conveyance apparatus inside each of the plurality of partial areas, wherein
    the automatic conveyance apparatus travels the plurality of partial areas in accordance with the partial area traveling order and travels the plurality of storage positions in accordance with the storage position traveling order inside each of the plurality of partial areas such that to convey the conveyance targets corresponding to the received conveyance requests inside the entire area.

2. The conveyance system according to claim 1, wherein a partial area traveling order rule prescribing an order of traveling on the plurality of partial areas is set, and the partial area traveling order setter sets the partial area traveling order, after setting the starting area, based on the partial area traveling order rule.

3. The conveyance system according to claim 2, wherein the partial area traveling order rule is set by a traveling order of a circulation of the plurality of partial areas.

4. The conveyance system according to claim 1, wherein a storage position traveling order rule prescribing an order of traveling on the plurality of storage positions in the plurality of partial areas is set, and the storage position traveling order setter sets the storage position traveling order based on the storage position traveling order rule.

5. The conveyance system according to claim 4, wherein the storage position traveling order rule is set by ranks of the plurality of storage positions in the plurality of partial areas, and the storage position traveling order setter sets the storage position traveling order based on the ranks set to the plurality of storage positions in the plurality of partial areas.

6. The conveyance system according to claim 1, wherein the starting area selector selects the starting area in accordance with an external request.

7. The conveyance system according to claim 1, wherein the starting area selector automatically selects the starting area in accordance with a predetermined condition.

8. The conveyance system according to claim 7, wherein the starting area selector measures a congestion level of the automatic conveyance apparatus in each of the plurality of partial areas and selects one of the plurality of partial areas with a lowest congestion level as the starting area.

9. The conveyance system according to claim 1, wherein the starting area selector randomly and automatically selects the starting area.

10. A conveyance method in which a plurality of partial areas is set inside an entire area in a warehouse, a plurality of storage positions storing conveyance targets is set inside each of the plurality of partial areas, and an automatic conveyance apparatus conveys the conveyance targets corresponding to received conveyance request inside the entire area, the conveyance method comprising:
- receiving the conveyance requests of the conveyance targets;
- selecting a starting area that is one of the plurality of partial areas that is traveled first;
- setting the starting area to one of the plurality of partial areas to be traveled first and setting a partial area traveling order that is an order of the plurality of partial areas traveled by the automatic conveyance apparatus; and
- setting a storage position traveling order that is an order of the plurality of storage positions traveled by the automatic conveyance apparatus inside each of the plurality of partial areas, wherein
- the automatic conveyance apparatus travels the plurality of partial areas in accordance with the partial area traveling order and travels the plurality of storage positions in accordance with the storage position traveling order inside each of the plurality of partial areas such that to convey the conveyance targets corresponding to the received conveyance requests inside the entire area.

11. A non-transitory computer-readable recording medium recording a conveyance program that sets a plurality of partial areas inside an entire area in a warehouse, that sets a plurality of storage positions storing conveyance targets inside each of the plurality of partial areas, and that causes an automatic conveyance apparatus to convey the conveyance targets corresponding to received conveyance request inside the entire area, the conveyance program causing one or more processors to:
- receive the conveyance requests of the conveyance targets;
- select a starting area that is one of the plurality of partial areas that is traveled first;
- set the starting area to one of the plurality of partial areas to be traveled first and setting a partial area traveling order that is an order of the plurality of partial areas traveled by the automatic conveyance apparatus; and
- set a storage position traveling order that is an order of the plurality of storage positions traveled by the automatic conveyance apparatus inside each of the plurality of partial areas, wherein
- the automatic conveyance apparatus travels the plurality of partial areas in accordance with the partial area traveling order and travels the plurality of storage positions in accordance with the storage position traveling order inside each of the plurality of partial areas such that to convey the conveyance targets corresponding to the received conveyance requests inside the entire area.

* * * * *